United States Patent
Qi et al.

(10) Patent No.: US 10,547,999 B2
(45) Date of Patent: Jan. 28, 2020

(54) DATA TRANSMISSION METHOD AND APPARATUS

(71) Applicant: TENCENT TECHNOLOGY (SHENZHEN) COMPANY LIMITED, Shenzhen, Guangdong (CN)

(72) Inventors: Sui Peng Qi, Shenzhen (CN); Shi Hai Cheng, Shenzhen (CN); Ming Yong Lin, Shenzhen (CN); Liang Liang Fan, Shenzhen (CN); Yi Fu Wang, Shenzhen (CN); Zhi Yong Yang, Shenzhen (CN); Jin Gui Wang, Shenzhen (CN); Lu Lu Xie, Shenzhen (CN); Feng Liu, Shenzhen (CN); Xiao Hui Yao, Shenzhen (CN); Dun Wei Wu, Shenzhen (CN); Qing Zhu Zhong, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 16/032,685

(22) Filed: Jul. 11, 2018

(65) Prior Publication Data
US 2018/0324575 A1 Nov. 8, 2018

Related U.S. Application Data

(63) Continuation of application No. PCT/CN2017/083717, filed on May 10, 2017.

(30) Foreign Application Priority Data

May 12, 2016 (CN) .......................... 2016 1 0321759

(51) Int. Cl.
*H04W 8/00* (2009.01)
*H04W 76/14* (2018.01)
(Continued)

(52) U.S. Cl.
CPC .......... *H04W 8/005* (2013.01); *G06F 3/0488* (2013.01); *H04W 76/11* (2018.02); *H04W 76/14* (2018.02);
(Continued)

(58) Field of Classification Search
CPC ..... H04W 8/005; H04W 76/11; H04W 88/04; H04W 76/14; H04W 4/80; H04W 76/15; H04L 67/34; H04L 67/06; G06F 3/0488
See application file for complete search history.

(56) References Cited

U.S. PATENT DOCUMENTS

2010/0257239 A1 10/2010 Roberts
2013/0290479 A1* 10/2013 Faher .................. G06F 9/44526
709/217
(Continued)

FOREIGN PATENT DOCUMENTS

CN 103561480 A 2/2014
CN 103595735 A 2/2014
(Continued)

OTHER PUBLICATIONS

"Micromessaging file transfer assistant is your personal secretary", BAIDU Experience, Apr. 16, 2016, Internet <https://jingyan.baidu.com/article/8ebacdf0267b3249f65cd5eb.html> (retrieved on Jul. 12, 2019) total 8 pages.
(Continued)

*Primary Examiner* — Afshawn M Towfighi
(74) *Attorney, Agent, or Firm* — Sughrue Mion, PLLC (57) ABSTRACT

A data transmission method is performed by at least one processor of a terminal, and includes displaying one or more messages, each of the one or more messages including a data file, based on a touch and hold input on one of the one or more messages, displaying an option for displaying one or more icons respectively indicating one or more hardware devices capable of executing the data file of the one of the one or more messages, based on a touch input on the option, displaying the one or more icons respectively indicating the one or more hardware devices, and based on a touch input on one of the one or more icons indicating one of the one or more hardware devices, sending, to the one of the one or more hardware devices, the data file of the one of the one or more messages.

17 Claims, 7 Drawing Sheets

(51) Int. Cl.
  *H04W 76/11* (2018.01)
  *G06F 3/0488* (2013.01)
  *H04W 88/04* (2009.01)
  *H04W 76/15* (2018.01)
  *H04W 4/80* (2018.01)

(52) U.S. Cl.
  CPC .............. *H04W 88/04* (2013.01); *H04W 4/80* (2018.02); *H04W 76/15* (2018.02)

(56) References Cited

U.S. PATENT DOCUMENTS

| | | | | |
|---|---|---|---|---|
| 2014/0006949 A1* | 1/2014 | Briand | ................ | G06F 3/04817 715/716 |
| 2014/0143682 A1* | 5/2014 | Druck | .................. | G06Q 10/107 715/752 |
| 2015/0373181 A1* | 12/2015 | Rahman | ............ | H04M 1/72547 455/466 |
| 2016/0012465 A1* | 1/2016 | Sharp | ..................... | G06Q 20/18 705/14.17 |
| 2018/0095992 A1* | 4/2018 | Mizuno | ............... | G06F 11/0733 |

FOREIGN PATENT DOCUMENTS

| | | |
|---|---|---|
| CN | 104394208 A | 3/2015 |
| CN | 105071940 A | 11/2015 |
| CN | 106027631 A | 10/2016 |
| KR | 10-2012-0003917 A | 1/2012 |
| KR | 10-2014-0111434 A | 9/2014 |

OTHER PUBLICATIONS

Communication dated Jul. 2, 2019 from the State Intellectual Property Office of the P.R.C. in counterpart Application No. 201610321759.9.

Baidu, "How to realize mutual file transmission between mobile phone, computer and ipad by qq", [Internet] <https://jingyan.baidu.com/article/0f5fb0991d79326d8334eab9.html>, dated Apr. 16, 2016, total 10 pages.

Communication dated Apr. 3, 2019 from the State Intellectual Property Office of the P.R.C. in counterpart Application No. 201610321759.9.

International Search Report for PCT/CN2017/083717 dated Jul. 28, 2017.

Written Opinion of the International Searching Authority for PCT/CN2017/083717 dated Jul. 28, 2017.

Communication dated Nov. 21, 2019, issued by the Korean Intellectual Property Office in corresponding Korean Application No. Oct. 2018-7022153 English Translation.

* cited by examiner

DATA TRANSMISSION METHOD AND APPARATUS

CROSS REFERENCE TO RELATED PATENT APPLICATIONS

This application is a continuation of International Application No. PCT/CN2017/083717, filed on May 10, 2017, which claims priority from Chinese Patent Application No. 201610321759.9, entitled "DATA TRANSMISSION METHOD AND APPARATUS" filed with the with the Chinese Patent Office on May 12, 2016, the disclosures of which are incorporated by reference herein in their entireties.

BACKGROUND

1. Field

The present disclosure relates to the field of communications technologies, and in particular, to a data transmission method and apparatus.

2. Description of Related Art

With the development of technologies of the Mobile Internet and the Internet of Things (IOT), a growing number of hardware devices have capabilities of accessing wireless networks. The characteristics of theses hardware devices are miniaturization and low power consumption. Most of the hardware devices, such as a WIFI sound box or a smart band, are not equipped with input peripherals such as a screen and a keyboard. Currently, a terminal may obtain data such as a geographical location, a picture, a video or audio by using a social application client. Because a hardware device such as a WIFI sound box or a smart band is not equipped with an input peripheral, a network connection cannot be established between the hardware device and the terminal. Without an established network connection, the terminal cannot send data in the social application client to the hardware device.

SUMMARY

It is an aspect to provide a data transmission method and apparatus, so as to improve the flexibility of interaction between a social application client and a hardware device, thereby improving the efficiency of interaction between the social application client and the hardware device.

According to an aspect of embodiments there is provided a data transmission method being performed by at least one processor of a terminal, the method including displaying one or more messages, each of the one or more messages including a data file, and based on a touch and hold input on one of the one or more messages, displaying an option for displaying one or more icons respectively indicating one or more hardware devices capable of executing the data file of the one of the one or more messages. The method further includes based on a touch input on the option, displaying the one or more icons respectively indicating the one or more hardware devices; and based on a touch input on one of the one or more icons indicating one of the one or more hardware devices, sending, to the one of the one or more hardware devices, the data file of the one of the one or more messages.

According to an aspect of embodiments, there is provided a data transmission apparatus including at least one memory configured to store computer program code, and at least one processor configured to access the at least one memory and operate according to the computer program code, the computer program code including displaying code configured to cause the at least one processor to display one or more messages, each of the one or more messages including a data file, based on a touch and hold input on one of the one or more messages, display an option for displaying one or more icons respectively indicating one or more hardware devices capable of executing the data file of the one of the one or more messages, and based on a touch input on the option, display the one or more icons respectively indicating the one or more hardware devices. The computer program code further includes sending code configured to cause the at least one processor to, based on a touch input on one of the one or more icons indicating one of the one or more hardware devices, send, to the one of the one or more hardware devices, the data file of the one of the one or more messages.

A non-transitory computer-readable storage medium storing instructions that cause at least one processor of a terminal to display one or more messages, each of the one or more messages including a data file, based on a touch and hold input on one of the one or more messages, display an option for displaying one or more icons respectively indicating one or more hardware devices capable of executing the data file of the one of the one or more messages. The instructions further cause the at least one processor to, based on a touch input on the option, display the one or more icons respectively indicating the one or more hardware devices, and based on a touch input on one of the one or more icons indicating one of the one or more hardware devices, send, to the one of the one or more hardware devices, the data file of the one of the one or more messages.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

The following clearly and completely describes the technical solutions in the embodiments of the present disclosure with reference to the accompanying drawings in the embodiments of the present disclosure. Obviously, the described embodiments are merely some rather than all embodiments of the present disclosure. All other embodiments obtained by a person of ordinary skill in the art based on the embodiments of the present disclosure without creative efforts shall fall within the protection scope of the present disclosure.

By implementing the embodiments disclosed herein, that is, displaying, when a data transmission instruction submitted by a user for to-be-transmitted data is detected, device identifier information of at least one hardware device associated with the social application client, determining, in response to a selection operation of the user in the at least one piece of device identifier information, a hardware device corresponding to device identifier information selected by the user, and sending the data to the hardware device, the flexibility of interaction between the social application client and the hardware device can be improved, thereby improving the efficiency of interaction.

An example embodiment according to certain aspects of the present disclosure provides a data transmission method. A social application client displays device identifier information of at least one hardware device when detecting a data transmission instruction submitted by a user for data currently needing to be transmitted, detects a selection operation of the user on at least one piece of device identifier information, to determine a hardware device corresponding to the device identifier information selected by the user, and sends the data currently needing to be transmitted to the determined hardware device.

In some embodiments, the social application client may include a WeChat client, a QQ client, a microblog client, or the like.

In some embodiments, the data currently needing to be transmitted may include a picture, text, audio, a video, a geographical location, or the like. For example, if the social application client is a WeChat client, the data may be located in a session window, or may be located in a friend circle, and this is not specifically limited by the embodiments of the present invention. In an implementation, the data currently needing to be transmitted may alternatively be an operating instruction submitted by the user by using the social application client, for example, an operating instruction of controlling on/off of an intelligent lamp, adjusting a temperature of an intelligent refrigerator, or controlling a micro sound box M7 to play a song.

Device identifier information of a hardware device is used to identify the hardware device. The device identifier information may be an icon, a device name, or the like. The icon is a computer graphic having an explicit reference meaning, such as an icon of a WeChat photo frame or an icon of a micro sound box M7. In some embodiments, the device name may be a device name configured for a hardware device, such as an ATH-AL00.

In some embodiments, the hardware device may be a device that is not equipped with an input peripheral, such as a micro sound box M7, a WeChat photo frame, or a smart band. In an implementation, the hardware device may alternatively be a device equipped with an input peripheral, such as a smartphone or an in-vehicle navigator, and this is not specifically limited by the embodiments of the present invention.

In some embodiments, the social application client may obtain the device identifier information of the hardware device by scanning a QR code of the hardware device or inputting a social application official account identifier of the hardware device (such as a WeChat official account identifier), and establish an association relationship between the social application client and the device identifier information of the hardware device.

In some embodiments, the data transmission method may be operated in a social application client installed on a terminal such as a tablet computer, a mobile phone, or a personal computer (PC).

Figure 1:
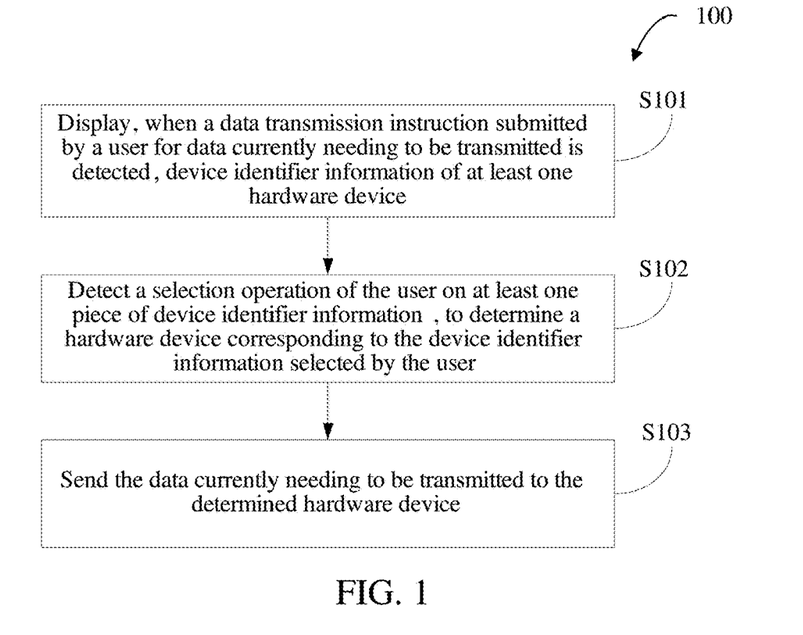
FIG. 1 is a schematic flowchart of a data transmission method according to an example embodiment.

FIG. 1 is a schematic flowchart of a data transmission method 100 according to an embodiment. As shown in FIG. 1, the data transmission method 100 includes the following:

S101: Display, when a data transmission instruction submitted by a user for data currently needing to be transmitted is detected, device identifier information of at least one hardware device. For example, at least one processor of the terminal may display one or more messages, each of the one or more messages comprising a data file, and based on a touch and hold input on one of the one or more messages, displaying an option for displaying one or more icons respectively indicating one or more hardware devices capable of executing the data file of the one of the one or more messages. The at least one processor of the terminal may further, based on a touch input on the option, display the one or more icons respectively indicating the one or more hardware devices.

In some embodiments, when a data transmission instruction submitted by a user for to-be-transmitted data is detected, device identifier information of at least one hardware device associated with the social application client is displayed.

When detecting the data transmission instruction submitted by the user for data currently needing to be transmitted, the social application client may display the device identifier information of the at least one hardware device. The social application client may establish, in advance, an association relationship between the social application client and the device identifier information of the at least one hardware device. When detecting the data transmission instruction submitted by the user for the data currently needing to be transmitted, the social application client may display the device identifier information of the at least one hardware device associated with the social application client.

Figure 6A:
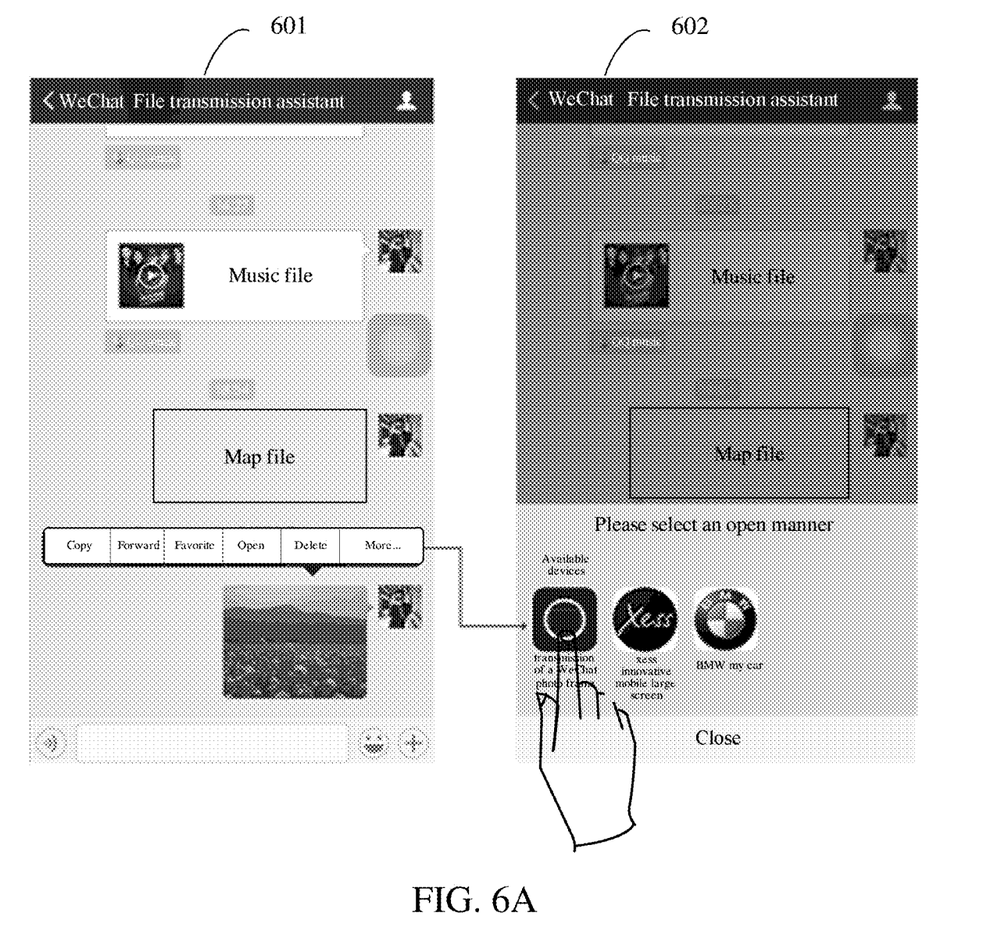
FIG. 6A is a schematic diagram of a WeChat interface according to an example embodiment.

Referring to the schematic diagram of a WeChat interface 601 and 602 shown in FIG. 6A, as an example, when the data currently needing to be transmitted is a picture, the user may touch and hold the picture. The social application client displays a data operation box when detecting a touch and hold operation of the user. The user taps a virtual key that has a function of displaying the device identifier information and that is in the data operation box, for example, a virtual key "open". That is, the user submits the data transmission instruction for the data currently needing to be transmitted. In some embodiments, the social application client may display the device identifier information of the at least one hardware device, for example, an icon of a WeChat photo frame, an icon of an Xess innovative mobile large screen, and an icon of a BMW car in response to the data transmission instruction.

S102: Detect a selection operation of the user on at least one piece of device identifier information, to determine a hardware device corresponding to the device identifier information selected by the user. For example, the at least one processor of the terminal may detect a touch input on one of the one or more icons indicating one of the one or more hardware devices.

After displaying the device identifier information of the at least one hardware device, the social application client may detect a selection operation of the user on at least one piece of device identifier information, to determine a hardware device corresponding to the device identifier information selected by the user.

In some embodiments, the hardware device corresponding to the device identifier information selected by the user is determined in response to the selection operation of the user in the at least one piece of device identifier information.

Referring back to the schematic diagram of the WeChat interface 601 and 602 shown in FIG. 6A as an example, the social application client displays device identifier information of three hardware devices, which are respectively: an icon of a WeChat photo frame, an icon of an Xess innovative mobile large screen, and an icon of a BMW car. When the user hopes to display the specified picture in the WeChat photo frame, the user may tap the icon of the WeChat photo frame. Then, after detecting the selection operation of the user, the social application client may determine that the hardware device corresponding to the device identifier information selected by the user is the WeChat photo frame.

S103: Send the data currently needing to be transmitted to the determined hardware device. For example, the at least one processor of the terminal may, based on the touch input on the one of the one or more icons indicating the one of the one or more hardware devices, sending, to the one of the one or more hardware devices, the data file of the one of the one or more messages.

The social application client may send the data currently needing to be transmitted to the determined hardware device. Referring again to the schematic diagram of the WeChat interface 601 and 602 shown in FIG. 6A as an example, after determining that the hardware device corresponding to the device identifier information selected by the user is a WeChat photo frame, the social application client may send the picture to the WeChat photo frame, so that the WeChat photo frame may display the picture.

In some embodiments, when detecting a near field communications instruction, the social application client may send the data currently needing to be transmitted to the determined hardware device by using a near field communications connection established in advance.

In some embodiments, the social application client may configure a wireless network access plug-in by using a preset application programming interface (API), establish a near field communications connection to the determined hardware device by using the wireless network access plug-in, and send the data currently needing to be transmitted to the determined hardware device by using the near field communications connection established in advance.

In some embodiments, the wireless network access plug-in may be an Airkiss plug-in. In specific implementation, the social application client may send, by using a near field communications connection, a WIFI account and a password corresponding to the WIFI account to a hardware device needing to transmit data. After the hardware device establishes a network connection to the social application client according to the WIFI account and the password corresponding to the WIFI account, the social application client may send a device identifier information obtaining request to the hardware device. The hardware device sends the device identifier information to the social application client in response to the device identifier information obtaining request, so that the social application client establishes an association relationship between the social application client and the device identifier information of the hardware device. A wireless local area network (WLAN) corresponding to the WIFI account is a local area network in which a terminal on which the social application client is installed and the hardware device needing to transmit data are located. According to this example embodiment, the WIFI account and the password corresponding to the WIFI account are sent to the hardware device by using an Airkiss plug-in, to establish the near field communications connection between the social application client and the hardware device. Data transmission is implemented by using a communications network, so that a near field communications connection may be established between the hardware device and the social application client when the hardware device is not equipped with an input apparatus (such as a touch panel) or an output apparatus (such as a display screen), thereby improving the reliability of data transmission.

For example, after determining the hardware device corresponding to the device identifier information selected by the user, the social application client may detect whether the near field communications connection to the hardware device is established. When detecting that the near field communications connection to the hardware device is successfully established, the social application client may generate a near field communications instruction, so as to send the data currently needing to be transmitted to the determined hardware device by using the near field communications connection established in advance. In an implementation, after determining the hardware device corresponding to the device identifier information selected by the user, the social application client may prompt the user that there are two communication methods: near field communication and cloud communication. If the user sends the near field communications instruction to the social application client by selecting the near field communication method, the social application client may send the data currently needing to be transmitted to the determined hardware device by using the near field communications connection established in advance.

In an embodiment, when detecting the near field communications instruction, the social application client may send the data currently needing to be transmitted to the social application server. The social application server performs security processing on the data currently needing to be transmitted. The social application server sends data obtained through the security processing to the social application client, so that the social application client sends the data obtained through the security processing to the determined hardware device by using the near field communications connection established in advance.

In an embodiment, when detecting a cloud communications instruction, the social application client may forward the data currently needing to be transmitted to a hardware device server by using the social application server, so that the hardware device server sends the data currently needing to be transmitted to the hardware device.

For example, after determining the hardware device corresponding to the device identifier information selected by the user, the social application client may detect whether the near field communications connection to the hardware device is established. When the social application client does not detect that the near field communications connection to the hardware device is established, the social application client may generate a cloud communications instruction, so as to send the data currently needing to be transmitted to the determined hardware device by using the social application server. In an implementation, after determining the hardware device corresponding to the device identifier information selected by the user, the social application client may prompt the user that there are two communication methods: near field communication and cloud communication. If the user sends the cloud communications instruction to the social application client by selecting the cloud communication method, the social application client may send the data currently needing to be transmitted to the determined hardware device by using the social application server.

In some implementations, the social application client may send the data currently needing to be transmitted to the social application server. The social application server sends a running state query message for the determined hardware device to the hardware device server. The hardware device server obtains running state information of the determined hardware device in response to the running state querying message. The hardware device server sends the running state information to the social application server. The social application server sends an instruction execution message for the determined hardware device to the hardware device server when a running state of the determined hardware device is an activated state, the instruction execution message carrying the data currently needing to be transmitted. The hardware device server sends the instruction execution message to the determined hardware device. The hardware device executes an instruction for the data.

In some embodiments, the social application client may obtain a link address corresponding to the data currently needing to be transmitted, and send the link address to the determined hardware device, so that the hardware device downloads the data corresponding to the link address by using the Internet. The link address corresponding to the data may be an access path, a uniform resource locator (URL), or the like. For example, the user hopes to play, in a micro sound box M7, music in the social application client. Then, after determining that the hardware device is the micro sound box M7, the social application client may obtain a link address of the music, and send the obtained link address to the micro sound box M7. The micro sound box M7 may download the music corresponding to the link address by using the Internet.

In some embodiments, when a data transmission instruction submitted by a user for data currently needing to be transmitted is detected, device identifier information of at least one hardware device is displayed, a selection operation of the user on at least one piece of device identifier information is detected, to determine a hardware device corresponding to the device identifier information selected by the user, and the data currently needing to be transmitted is sent to the determined hardware device, so that the flexibility of interaction between the social application client and the hardware device may be improved, thereby improving the efficiency of interaction.

Figure 2:
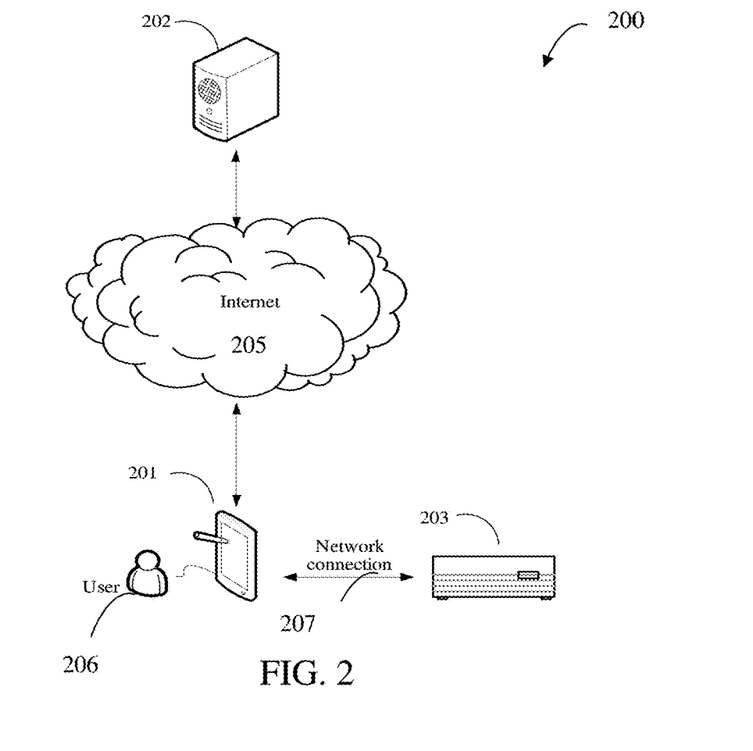
FIG. 2 is a schematic diagram of a data transmission architecture according to an example embodiment.

FIG. 2 is a schematic diagram of a data transmission architecture 200 according to an example embodiment. As shown in FIG. 2, the data transmission architecture 200 includes a social application client 201, a social application server 202, and a hardware device 203. A network connection 207 is established between the social application server 202 and the social application client 201 via the network (Internet) 205. The social application client 201 establishes the network connection 207 to the hardware device 203 by using a preset wireless network access plug-in.

The social application client 201 is configured to display device identifier information of at least one hardware device when detecting a data transmission instruction submitted by a user 206 for data currently needing to be transmitted, detect a selection operation of the user 206 on at least one piece of device identifier information, to determine the hardware device 203 corresponding to the device identifier information selected by the user 206, and send the data currently needing to be transmitted to the social application server 202.

The social application server 202 is configured to perform security processing on the data currently needing to be transmitted, and send the data obtained through the security processing to the social application client 201.

The social application client 201 is further configured to send the data obtained through the security processing to the determined hardware device 203 by using a preset wireless network access plug-in.

Figure 3:
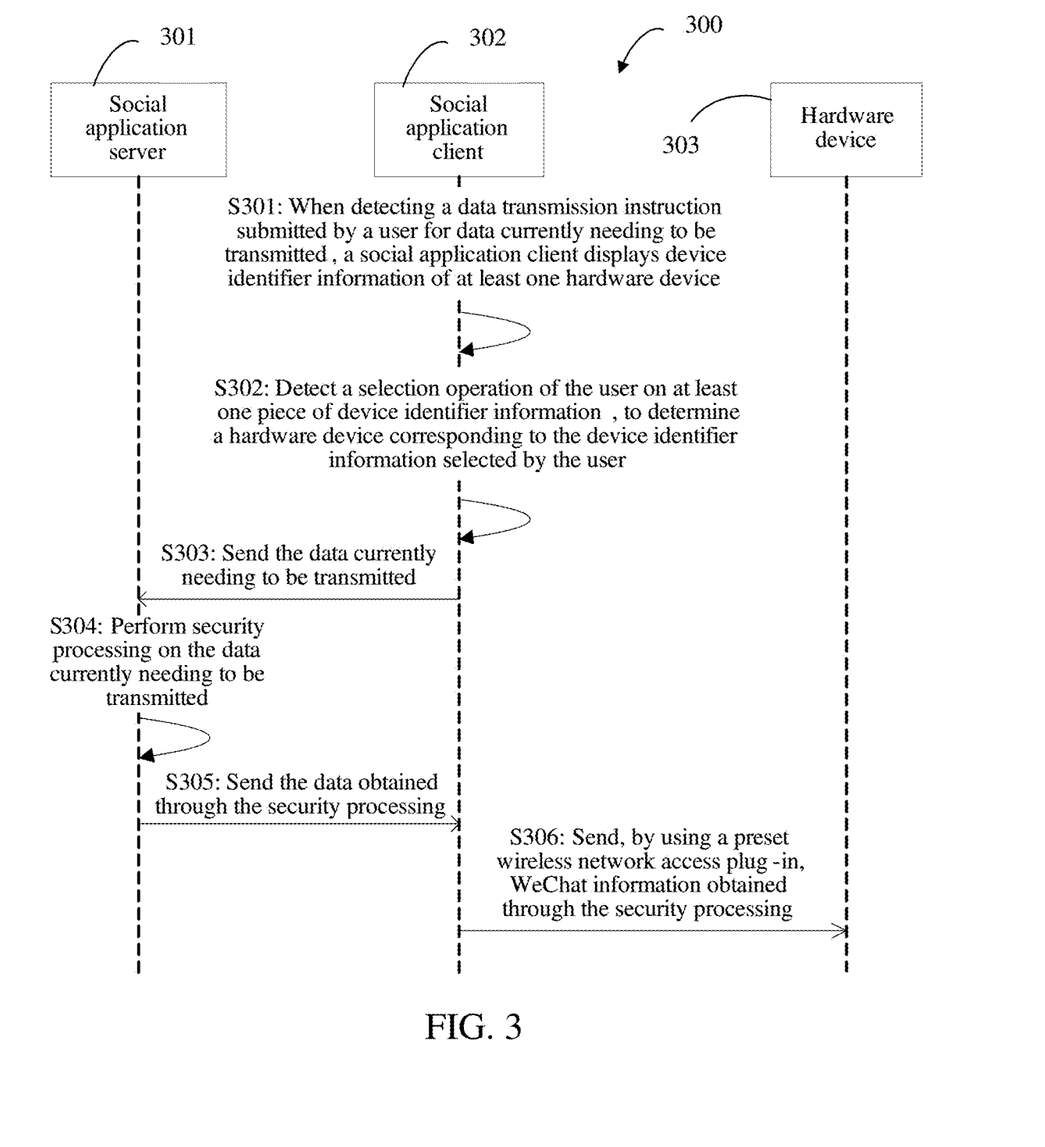
FIG. 3 is a schematic flowchart of a data transmission method according to another example embodiment.

FIG. 3 is a schematic flowchart of a data transmission method 300 according to another example embodiment. The data transmission method 300, shown in FIG. 3, may be implemented using the data transmission architecture 200, shown in FIG. 2. As shown in FIG. 3, the data transmission method 300 includes the following:

S301: When detecting a data transmission instruction submitted by a user, such as the user 206 in FIG. 2, for data currently needing to be transmitted, a social application client 302 displays device identifier information of at least one hardware device 303.

S302: The social application client 302 detects a selection operation of the user, such as the user 206 in FIG. 2, on at least one piece of device identifier information, to determine a hardware device corresponding to the device identifier information selected by the user 206.

S303: The social application client 302 sends the data currently needing to be transmitted to a social application server 301.

S304: The social application server 301 performs security processing on the data currently needing to be transmitted.

S305: The social application server 301 sends the data obtained through the security processing to the social application client 302.

S306: The social application client 302 sends the data obtained through the security processing to the determined hardware device 303 by using a preset wireless network access plug-in.

In some embodiments, the wireless network access plug-in may be an Airkiss plug-in, and the social application client may send a WIFI account of a WLAN network and a password corresponding to the WIFI account to the determined hardware device by using the preset Airkiss plug-in. The determined hardware device may be connected to the WLAN network according to the WIFI account and the password corresponding to the WIFI account, so as to establish a network connection to the social application client. The social application client 302 sends data obtained through security processing to the determined hardware device 303 by using the established network connection to the determined hardware device 303. The WLAN network is a network in which a terminal on which the social application client 302 is installed and the determined hardware device 303 are located.

In some embodiments, the social application client 302 may obtain a link address corresponding to the data currently needing to be transmitted, and send the link address to the determined hardware device 303 by using the preset wireless network access plug-in, so that the hardware device 303 downloads the data corresponding to the link address by using the Internet. For example, the data currently needing to be transmitted may be obtained by the social application client 302 by using the Internet, and then the social application client 302 may obtain the link address corresponding to the data currently needing to be transmitted. In some embodiments, the data obtained by using the Internet may include music, a picture, a video, a file, or the like.

In some embodiments, the wireless network access plug-in may be an Airkiss plug-in. It should be noted that an Airkiss technology is a near field communications technology based on WeChat hardware. If the hardware device supports an SDK of the social application client, the hardware device may directly communicate with the social application client in the WLAN network.

In some embodiments, the social application server 301 may develop an SDK corresponding to each operating system such as Android (an operating system developed by Google Inc) or Linux (an operating system based on Linux kernel). After the hardware device server obtains the SDK corresponding to the operating system by using the social application server, corresponding development needs to be performed on the hardware device. The data transmission method 300 may be implemented if the hardware device 303 is compatible with the SDK. An Android SDK is used as an example below.

Figure 6B:
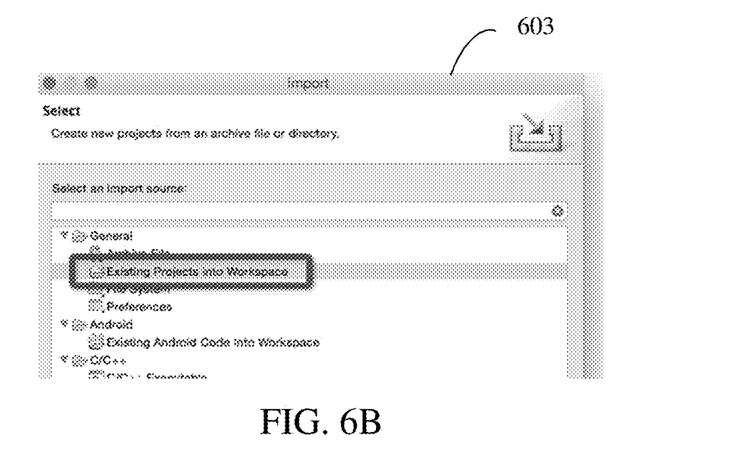
FIG. 6B is a schematic diagram of a software development kit (SDK) operating interface according to an example embodiment.

For a hardware device running on an Android system, the social application server 301 provides an SDK (.so library) corresponding to the Android system, and the SDK does not rely on an Android version used by the hardware device 303. A developer corresponding to the hardware device may load the SDK and an API type file that correspond to the Android system to a specified application (App). For example, the SDK may be libairkiss3.so or libstlport_shared.so, and the API type file may be /com/tencent/wechat/AirKiss3.java. If the developer modifies a packet name or a method name, a dynamic library cannot be used. Referring to the schematic diagram of an SDK operating interface shown in FIG. 6B as an example, a log may be exported by using Logcat (Logcat is a command line tool in Android, and may be used to obtain log information of a program) during SDK operation. Reference may be made to a "HelloJni" project shown in FIG. 6C for detailed project and code examples. The hardware device 303 may directly import by using Eclipse.

Figure 6C:
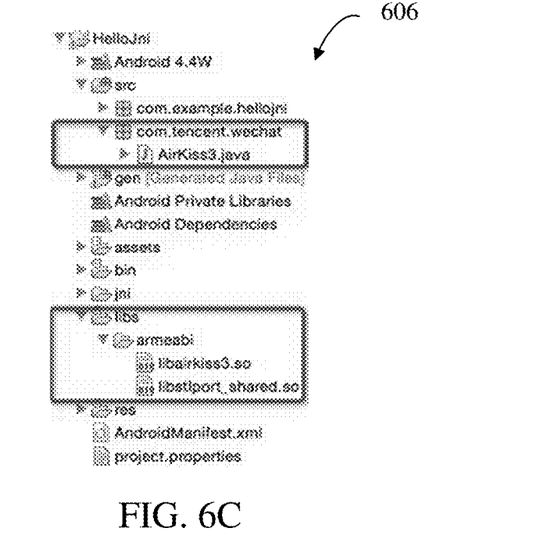
FIG. 6C is a schematic structural diagram of a file in a project according to an example embodiment.

In some embodiments, the structures of the SDK and the API type file in the project may as be shown in FIG. 6C.

Because the SDK needs to perform a network connection, for a newly established project, a network permission needs to be added to xml. After the specified App of the hardware device is started, the SDK corresponding to the operating system of the hardware device needs to be loaded. When the App has an Application inlet, the SDK may be configured at the Application inlet. For example, a code for performing the foregoing operation may be:

```
static (
System.loadlidrary ("stlport_shared");
System.loadlidrary ("airkiss3")
)
```

When detecting a data transmission instruction submitted by a user for data currently needing to be transmitted, the social application client 302 displays device identifier information of at least one hardware device 303. The social application client 302 detects a selection operation of the user on at least one piece of device identifier information, to determine a hardware device 303 corresponding to the device identifier information selected by the user. The social application client 302 sends the data currently needing to be transmitted to the social application server 301. The social application server 301 performs security processing on the data currently needing to be transmitted. The social application server 301 sends data obtained through the security processing to the social application client 302. The social application client 302 sends the data obtained through the security processing to the determined hardware device 303 by using a preset wireless network access plug-in. The wireless network access plug-in may facilitate rapid establishment of a WIFI connection between the social application client 302 and the hardware device 303, thereby improving the data transmission rate.

Figure 4:
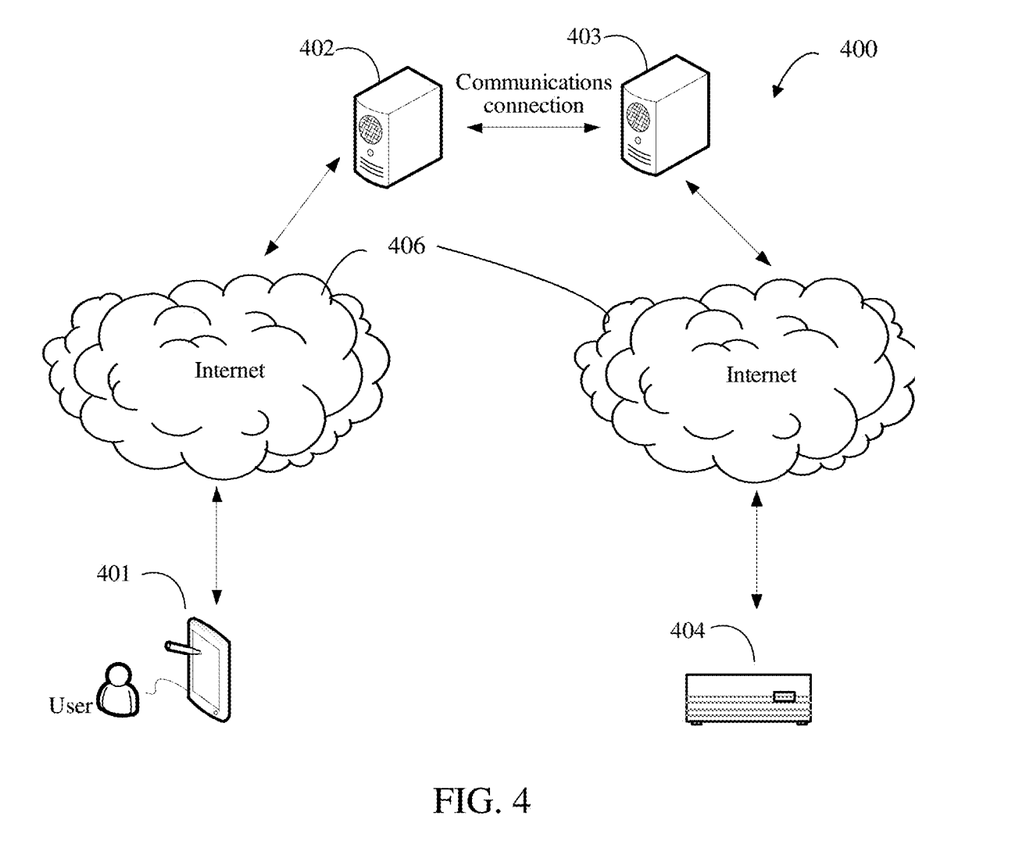
FIG. 4 is a schematic diagram of a data transmission architecture according to another example embodiment.

FIG. 4 shows a schematic diagram of a data transmission architecture 400 according to another example embodiment. As shown in FIG. 4, the data transmission architecture 400 includes a social application client 401, a social application server 402, a hardware device server 403, and a hardware device 404. The social application client 401 separately establishes a communications connection to the social application server 402 and the hardware device server 403. A communications connection is established between the hardware device server 403 and the hardware device 404.

The social application client 401 is configured to display device identifier information of at least one hardware device when detecting a data transmission instruction submitted by a user for data currently needing to be transmitted, detect a selection operation of the user on at least one piece of device identifier information, to determine the hardware device 404 corresponding to the device identifier information selected by the user, and send the data currently needing to be transmitted to the social application server 402.

The social application server 402 is configured to send the data currently needing to be transmitted to the hardware device server 403.

The hardware device server 403 is configured to send the data currently needing to be transmitted to the determined hardware device 404.

Figure 5:
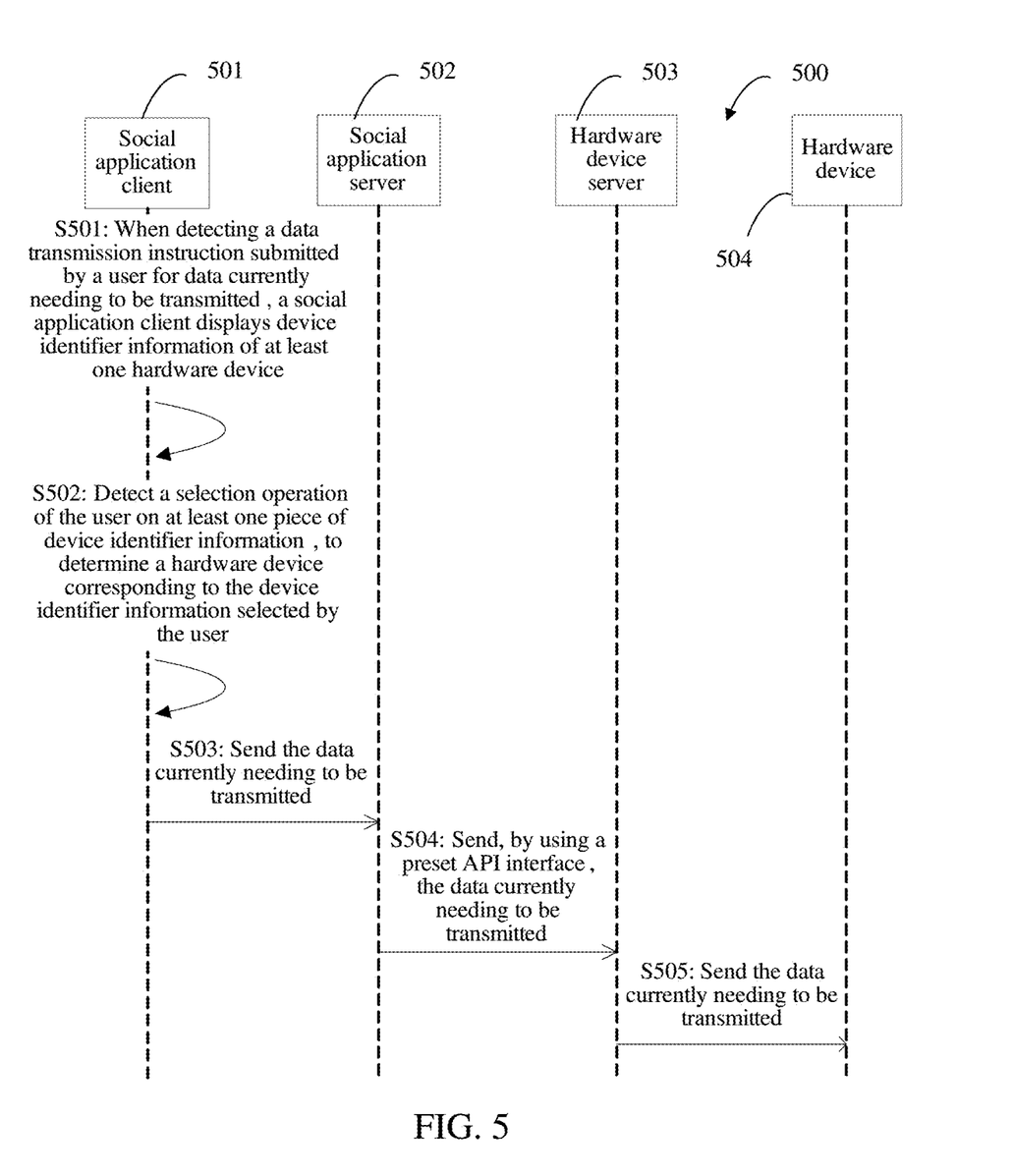
FIG. 5 is a schematic flowchart of a data transmission method according to still another example embodiment.

FIG. 5 shows a data transmission method 500 according to an example embodiment. The data transmission method 500 may be implemented using the data transmission architecture 400 shown in FIG. 4. As shown in FIG. 5, the data transmission method 500 includes:

S501: When detecting a data transmission instruction submitted by a user for data currently needing to be transmitted, a social application client 501 displays device identifier information of at least one hardware device.

S502: The social application client 501 detects a selection operation of the user on at least one piece of device identifier information, to determine a hardware device 504 corresponding to the device identifier information selected by the user.

S503: The social application client 501 sends the data currently needing to be transmitted to a social application server 502.

In an embodiment, the social application client 501 may obtain a link address corresponding to the data currently needing to be transmitted, and send the link address to the social application server 502.

S504: The social application server 502 sends the data currently needing to be transmitted to the hardware device server 503 by using a preset API interface.

In an embodiment, after receiving the link address sent by the social application client, the social application server 502 may send the link address to the hardware device server 503 by using a preset API interface.

In some embodiments, the preset API interface may be an openAPI interface of the social application client 501. The functions of the API interface are:

Device Initialization Function

The device initialization function is used to allocate a memory space and an initialization parameter to the hardware device. After initialization succeeds, a device release function needs to be called when the initiation ends, to prevent a memory leak.

| Interface prototype | public static native long deviceInit(String deviceType, String deviceId, String deviceName, int services, short port) | |
|---|---|---|
| Parameter | String deviceType | Device type, generally referring to an official account name, for example, in a form of gh_XXXXX |
| | String deviceId | Device Id during device authorization |
| | String deviceName | Device name, which may not be filled |
| | int services | Service types supported by the device, and a plurality of service types may be synchronously supported |
| | Short port | Tcp service port monitored by the device |
| Return value | Long | If initialization succeeds, a device handle is returned, and if the initialization fails, 0 is returned |

Device Release Function

The device release function is used to release the memory space allocated to the hardware device during initialization.

| Interface prototype | public static native void deviceFree(long deviceHandle) | |
|---|---|---|
| Parameter | long deviceHandle | Device handle returned during device initialization |
| Return value | None | |

Device Service Start Function

| Interface prototype | public static native int deviceStart(long deviceHandle) | |
|---|---|---|
| Parameter | long deviceHandle | Device handle returned during device initialization |
| Return value | Int | If startup succeeds, 0 is returned, and if the startup fails, a negative value is returned |

Device Service Stop Function

| Interface prototype | public static native void deviceStop(long deviceHandle) | |
|---|---|---|
| Parameter | long deviceHandle | Device handle returned during device initialization |
| Return value | None | |

Device Notification Function

| Interface prototype | public static native void deviceNotify(long sessionId, String notifyData) | |
|---|---|---|
| Parameter | long sessionId | Session handle returned during device initialization |
| | NotifyData | Only JSApi data is supported currently. See Appendix 2: Device notification data formats for the format |
| Return value | None | |

Device Event Callback Function

It should be noted that the device event callback function is called by a thread running on a JNI layer. Then a service does not need to be directly processed in the callback function. Instead, data is sent to a working thread for processing.

| Interface prototype | public static void onDeviceCallback(long deviceHandle, int event, int error, byte[ ] data, long sessionId) | |
|---|---|---|
| Parameter | long deviceHandle | Device handle returned during device initialization deviceHandle |
| | int event | Event types of device callback. See Appendix 3: Callback event types and data formats for details |
| | int error | Error codes during erroneous callback |
| | byte[ ] data | Data during event callback. See Appendix 3: Callback event types and data formats for details |
| | long sessionId | Session handles generating callback |
| Return value | None | |

It should be noted that messages of three different types, such as a running state querying message, an instruction execution message, and a running state notification message may be transmitted between the social application server and the hardware device server.

The running state querying message is used to query a running state of the hardware device 504. For example, the social application server 502 may send the running state querying message to the hardware device server 503. The running state querying message may carry the device identifier information of the hardware device 504. After receiving the running state querying message, the hardware device server 503 may feed back a first receiving success message to the social application server 502. The first receiving success message is used to indicate successful reception of the running state querying message sent by the social application server 502. The hardware device server 503 may query the running state of the hardware device 504 corresponding to the device identifier information in response to the running state querying message, and send the running state information of the hardware device 504 to the social application server 502. The running state information may be used to indicate that the running state of the hardware device 504 is an activated state or a deactivated state. In some embodiments, the hardware device server 503 may further query parameter information of the hardware device 504. Then the running state information received by the social application server 502 may further include parameter information. For example, when the hardware device 504 is a micro sound box M7, the parameter information of the hardware device 504 may include: whether audio is played currently, an audio name corresponding to the played audio, a play volume, or the like. The audio name, for example, is a song name, a drama name, or a novel name.

The instruction execution message is used to indicate an instruction that needs to be executed by the hardware device 504. For example, when the running state of the hardware device 504 is an activated state, the social application server 502 sends the instruction execution message to the hardware device server 503. The instruction execution message carries the data currently needing to be transmitted. After receiving the instruction execution message, the hardware device server 503 may feed back a second receiving success message to the social application server 502. The second receiving success message is used to indicate successful reception of the instruction execution message sent by the social application server 502. The hardware device server 503 may send the instruction execution message to the hardware device. The hardware device 504 may execute an instruction for the data. For example, when the data is music, the instruction may be playing the music. For another example, when the data is switching off a lamp, the instruction executed by the hardware device 504 for the data may be switching off a light source. After successfully executing the instruction for the data, the hardware device 504 may send an execution result to the hardware device server 503, so that the hardware device server 503 sends the execution result to the social application server 502.

The running state notification message is used to indicate that the hardware device server 503 sends the current running state information of the hardware device 504 to the social application server 503. The hardware device server 503 may monitor the running state of the hardware device 504 in real time. When the running state of the hardware device 504 changes, the hardware device server 503 may send the current running state information of the hardware device 504 to the social application server 502. After receiving the running state notification message, the social application server 502 may feed back a third receiving success message to the hardware device server 503. The third receiving success message is used to indicate successful reception of the running state notification message sent by the hardware device server 503. The social application server 502 may process the running state notification message, and send a processing result to the hardware device server 503.

In some embodiments, after the social application client 501 sends the data currently needing to be transmitted to the social application server 502, the social application server 502 may send a running state query message for the determined hardware device 504 to the hardware device server 503. The hardware device server 503 obtains running state information of the determined hardware device 504 in response to the running state querying message, and sends the running state information to the social application server 502. The social application server 502 sends an instruction execution message for the determined hardware device 504 to the hardware device server 503 when a running state of the determined hardware device 504 is an activated state, the instruction execution message carrying the data currently needing to be transmitted.

S505: The hardware device server 503 sends the data currently needing to be transmitted to the determined hardware device 504.

In an example embodiment, after the social application server 502 sends the instruction execution message for the determined hardware device 504 to the hardware device server 503, the hardware device server may send the instruction execution message to the determined hardware device 504. The hardware device 504 may execute an instruction for the data.

In an example embodiment, after receiving the link address, the hardware device server 503 may send the link address to the determined hardware device 504, so that the hardware device 504 downloads the data corresponding to the link address by using the Internet.

When detecting a data transmission instruction submitted by a user for data currently needing to be transmitted, a social application client 501 displays device identifier information of at least one hardware device. The social application client 501 detects a selection operation of the user on at least one piece of device identifier information, to determine a hardware device corresponding to the device identifier information selected by the user. The social application client 501 sends the data currently needing to be transmitted to a social application server 502. The social application server 502 sends the data currently needing to be transmitted to a hardware device server 503 by using a preset API interface. The hardware device server 503 sends the data currently needing to be transmitted to the determined hardware device 504. Data transmission is not limited by the distance, and long distance transmission of data may be implemented.

Figure 7:
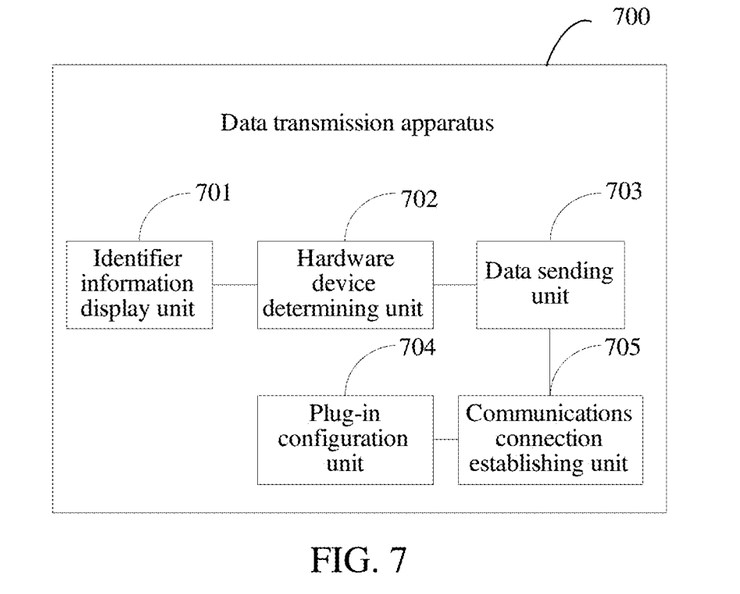
FIG. 7 is a schematic structural diagram of a data transmission apparatus according to an example embodiment.

FIG. 7 is a schematic structural diagram of a data transmission apparatus 700 according to an example embodiment. The data transmission apparatus 700 may include a social application client installed on a terminal such as a tablet computer, a mobile phone, or a PC. As shown in FIG. 7, the data transmission apparatus 700 includes at least an identifier information display unit 701, a hardware device determining unit 702, and a data sending unit 703.

The identifier information display unit 701 is configured to display device identifier information of at least one hardware device when a data transmission instruction submitted by a user for data currently needing to be transmitted is detected.

The hardware device determining unit 702 is configured to detect a selection operation of the user on at least one piece of device identifier information, to determine a hardware device corresponding to the device identifier information selected by the user.

The data sending unit 703 is configured to send the data currently needing to be transmitted to the determined hardware device.

In an implementation, the identifier information display unit 701 is configured to display, when a data transmission instruction submitted by the user for the to-be-transmitted data is detected, the device identifier information of the at least one hardware device associated with the social application client; the hardware device determining unit 702 is configured to determine, in response to a selection operation of the user in the at least one piece of device identifier information, a hardware device corresponding to the device identifier information selected by the user; and the data sending unit 703 is configured to send the data to the hardware device.

In an embodiment, the data sending unit 703 is configured to send, when a near field communications instruction is detected, the data currently needing to be transmitted to the determined hardware device by using a near field communications connection established in advance.

In an example embodiment, the data transmission apparatus 700 may further include a plug-in configuration unit 704 and a communications connection establishing unit 705.

The plug-in configuration unit 704 is configured to configure a wireless network access plug-in by using a preset API.

The communications connection establishing unit 705 is configured to establish a near field communications connection to the determined hardware device by using the wireless network access plug-in.

In an example embodiment, the sending, by the data sending unit 703, when a near field communications instruction is detected, the data currently needing to be transmitted to the determined hardware device by using a near field communications connection established in advance specifically includes:

sending the data currently needing to be transmitted to a social application server when the near field communications instruction is detected, so that the social application server performs security processing on the data currently needing to be transmitted;

receiving data obtained through the security processing and sent by the social application server; and sending the data obtained through the security processing to the determined hardware device by using the near field communications connection established in advance.

In an example embodiment, the data sending unit 703 is configured to forward, when a cloud communications instruction is detected, the data currently needing to be transmitted to a hardware device server by using the social application server, so that the hardware device server sends the data currently needing to be transmitted to the hardware device.

In an example embodiment, the forwarding, by the data sending unit 703, the data currently needing to be transmitted to a hardware device server by using the social application server, so that the hardware device server sends the data currently needing to be transmitted to the hardware device includes:

sending the data currently needing to be transmitted to the social application server, so that the social application server sends a running state query message for the determined hardware device to the hardware device server, the hardware device server obtains running state information of the determined hardware device in response to the running state querying message, the hardware device server sends the running state information to the social application server, the social application server sends an instruction execution message for the determined hardware device to the hardware device server when a running state of the determined hardware device is an activated state, the instruction execution message carrying the data currently needing to be transmitted, the hardware device server sends the instruction execution message to the determined hardware device, and the hardware device executes an instruction for the data.

In an example embodiment, the data sending unit 703 is specifically configured to:

obtain a link address corresponding to the data currently needing to be transmitted; and send the link address to the determined hardware device, so that the hardware device downloads the data according to the link address by using the Internet.

Referring to FIG. 7, an identifier information display unit 701 displays, when a data transmission instruction submitted by a user for data currently to-be-transmitted is detected, device identifier information of at least one hardware device; a hardware device determining unit 702 detects a selection operation of the user on at least one piece of device identifier information, to determine a hardware device corresponding to the device identifier information selected by the user; and the data sending unit 703 is configured to send the data currently needing to be transmitted to the determined hardware device, so as to improve the flexibility of interaction between a social application client and the hardware device, thereby improving the efficiency of interaction.

Figure 8:
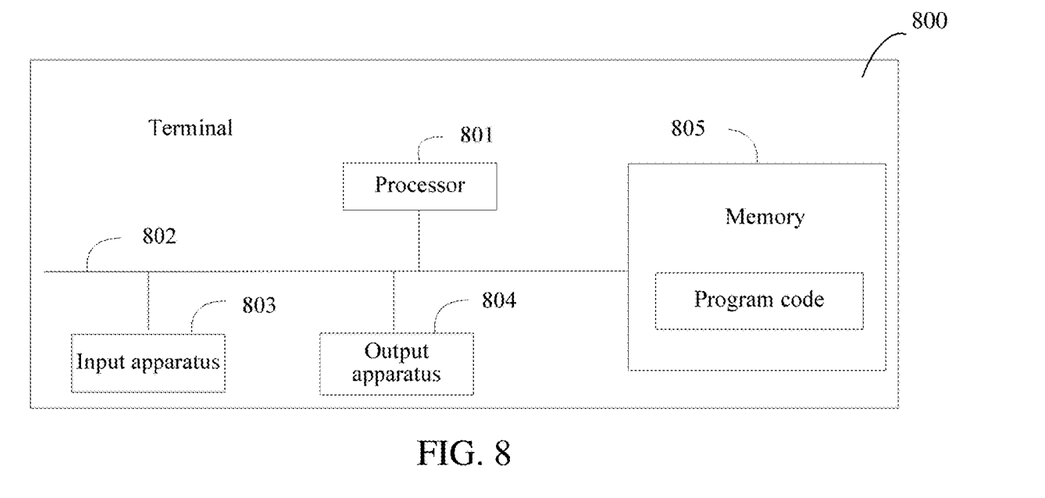
FIG. 8 is a schematic structural diagram of a terminal according to an example embodiment.

FIG. 8 is a schematic structural diagram of a terminal 800 according to an example. The terminal 800 may be configured to perform the methods according to the example embodiments shown in FIG. 1, FIG. 3, or FIG. 5. For ease of description, only a part related to this example embodiment is shown and specific technical details are not disclosed. Reference may be also made to the example embodiments, shown in FIG. 1, FIG. 3, or FIG. 5.

As shown in FIG. 8, the terminal 800 includes: at least one processor 801 such as a CPU, at least one input apparatus 803, at least one output apparatus 804, a memory 805, and at least one communications bus 802. The communications bus 802 is configured to implement connection and communication between these components. The input apparatus 803 may be specifically a control panel, or the like, and is configured to detect a data transmission instruction submitted by a user for data currently needing to be transmitted, and a selection operation of the user on at least one piece of device identifier information. The output apparatus 804 may be specifically a network interface, and is configured to send the data currently needing to be transmitted to a determined hardware device. The output apparatus 804 may be specifically a display screen, and is configured to display device identifier information of at least one hardware device. The memory 805 may include a high speed random access memory RAM, or may further include a non-volatile memory, for example, at least at least one magnetic disk memory, specifically configured to store the data currently needing to be transmitted and the device identifier information of the at least one hardware device. In an implementation, the memory 805 may include at least one storage apparatus located away from the processor 801. The processor 801 may be combined with the data transmission apparatus shown in FIG. 7. The memory 805 stores a group of program codes, and the processor 801, the input apparatus 803, and the output apparatus 804 call the program codes stored in the memory 805, to perform the following operations:

when the input apparatus 803 detects a data transmission instruction submitted by the user for the data currently needing to be transmitted, displaying, by the output apparatus 804, the device identifier information of the at least one hardware device, detecting, by the input apparatus 803, a selection operation of the user on at least one piece of device identifier information, and determining, by the processor 801, a hardware device corresponding to the device identifier information selected by the user, and sending, by the output apparatus 804, the data currently needing to be transmitted to the determined hardware device.

In an example embodiment, the sending, by the output apparatus 804, the data currently needing to be transmitted to the determined hardware device may be specifically:

sending, by the output apparatus 804, the data currently needing to be transmitted to the determined hardware device by using a near field communications connection established in advance when detecting a near field communications instruction.

In an example embodiment, before the sending, by the output apparatus 804, the data currently needing to be transmitted to the determined hardware device by using a near field communications connection established in advance when detecting a near field communications instruction, the following operations may further be performed:

configuring, by the processor 801, a wireless network access plug-in by using a preset API, and establishing, by the processor 801, a near field communications connection to the determined hardware device by using the wireless network access plug-in.

In an example embodiment, the sending, by the output apparatus 804, the data currently needing to be transmitted to the determined hardware device by using a near field communications connection established in advance when detecting a near field communications instruction may be specifically:

sending, by the output apparatus 804, the data currently needing to be transmitted to a social application server when detecting the near field communications instruction, so that the social application server performs security processing on the data currently needing to be transmitted;

receiving, by the input apparatus 803, data obtained through the security processing and sent by the social application server, and sending, by the output apparatus 804, the data obtained through the security processing to the determined hardware device by using the near field communications connection established in advance.

In some embodiments, the sending, by the output apparatus 804, the data currently needing to be transmitted to the determined hardware device may be specifically:

forwarding, by the output apparatus 804, the data currently needing to be transmitted to a hardware device server by using the social application server when detecting a cloud communications instruction, so that the hardware device server sends the data currently needing to be transmitted to the hardware device.

In an implementation, the forwarding, by the output apparatus 804, the data currently needing to be transmitted to a hardware device server by using the social application server, so that the hardware device server sends the data currently needing to be transmitted to the hardware device may be specifically:

sending, by the output apparatus 804, the data currently needing to be transmitted to the social application server, so that the social application server sends a running state query message for the determined hardware device to the hardware device server, the hardware device server obtains running state information of the determined hardware device in response to the running state querying message, the hardware device server sends the running state information to the social application server, the social application server sends an instruction execution message for the determined hardware device to the hardware device server when a running state of the determined hardware device is an activated state, the instruction execution message carrying the data currently needing to be transmitted, the hardware device server sends the instruction execution message to the determined hardware device, and the hardware device executes an instruction for the data.

In some embodiments, the sending, by the output apparatus 804, the data currently needing to be transmitted to the determined hardware device may be specifically:

obtaining, by the processor 801, a link address corresponding to the data currently needing to be transmitted, and sending, by the output apparatus 804, the link address to the determined hardware device, so that the hardware device downloads the data according to the link address by using the Internet.

Specifically, the terminal 800 may be used to implement some or all processes in the method embodiments shown in FIG. 1, FIG. 3, or FIG. 5 of the present disclosure.

A person of ordinary skill in the art may understand that all or some of the processes of the methods in the foregoing embodiments may be implemented by a computer program instructing relevant hardware. The program may be stored in a non-volatile computer readable storage medium, and may include, for example, processes of the embodiments of the foregoing methods when executed. The storage medium may be a magnetic disk, an optical disc, a read-only memory (ROM), a RAM, or the like.

What is disclosed above is merely preferred embodiments of the present invention, and certainly cannot be intended to limit the scope of the claims of the present disclosure. Therefore, equivalent variations made in accordance with the claims of the present disclosure still fall within the scope of the present disclosure and the appended claims.

What is claimed is:

1. A data transmission method being performed by at least one processor of a terminal, the method comprising:

displaying one or more messages, each of the one or more messages comprising a data file;

based on a touch and hold input on one of the one or more messages, displaying an option for displaying one or more icons respectively indicating one or more hardware devices capable of executing the data file of the one of the one or more messages;

based on a touch input on the option, displaying the one or more icons respectively indicating the one or more hardware devices;

based on a touch input on one of the one or more icons indicating one of the one or more hardware devices, sending, to the one of the one or more hardware devices, the data file of the one of the one or more messages; and establishing a near field communications connection with the one of the one or more hardware devices, using a wireless network access plug-in, wherein the sending the data file of the one of the one or more messages comprises, based on a user input for near field communications, sending, to the one of the one or more hardware devices, the data file of the one of the one or more messages, using the near field communications connection established with the one of the one or more hardware devices.

2. The method of claim 1, wherein the sending the data file of the one of the one or more messages further comprises, based on a user input for cloud communications, sending the data file of the one of the one or more messages to the one of the one or more hardware devices through a server of the one of the one or more hardware devices.

3. The method of claim 2, wherein the sending the data file further comprises:

sending the data file to a social application server, to generate a running state query message of the one or more hardware devices in the server of the one of the one or more hardware devices; and acknowledging, from the social application server to the server of the one of the one or more hardware devices, an instruction execution message including the data file that is sent in response to an activated running state of the one or more hardware devices.

4. The method of claim 1, wherein the establishing the near field communications connection comprises sending, to the one of the one or more hardware devices, a WiFi account and a password corresponding to the WiFi account, using the near field communications connection.

5. The method of claim 1, further comprising:

based on the near field communications connection being established, sending, to the one of the one or more hardware devices, device identifier information obtaining request;

receiving, from the one of the one or more hardware devices, device identifier information one of the one of the one or more hardware devices; and establishing an association relationship between the terminal and the device identifier information.

6. The method of claim 1, wherein the sending the data file of the one of the one or more messages comprises, based on the user input for near field communications:

sending, to a social application server, the data file of the one of the one or more messages;

receiving, from the social application server, the data file that is security-processed; and sending, to the one of the one or more hardware devices, the data file that is security-processed, using the near field communications connection established with the one of the one or more hardware devices.

7. The method of claim 1, wherein the sending the data file of the one of the one or more messages further comprises:
obtaining a link address of the data file of the one of the one or more message; and
sending the link address to the one of the one or more hardware devices.

8. A data transmission apparatus comprising:
at least one memory configured to store computer program code; and
at least one processor configured to access the at least one memory and operate according to the computer program code, the computer program code comprising:
displaying code configured to cause the at least one processor to:
display one or more messages, each of the one or more messages comprising a data file;
based on a touch and hold input on one of the one or more messages, display an option for displaying one or more icons respectively indicating one or more hardware devices capable of executing the data file of the one of the one or more messages; and
based on a touch input on the option, display the one or more icons respectively indicating the one or more hardware devices;
sending code configured to cause the at least one processor to, based on a touch input on one of the one or more icons indicating one of the one or more hardware devices, send, to the one of the one or more hardware devices, the data file of the one of the one or more messages; and
establishing code configured to cause the at least one processor to establish a near field communications connection with the one of the one or more hardware devices, using a wireless network access plug-in,
wherein the sending code is further configured to cause the at least one processor to, based on a user input for near field communications, sending, to the one of the one or more hardware devices, the data file of the one of the one or more messages, using the near field communications connection established with the one of the one or more hardware devices.

9. The apparatus of claim 8, wherein the sending code is further configured to cause the at least one processor to, based on a user input for cloud communications, send the data file of the one of the one or more messages to the one of the one or more hardware devices through a server of the one of the one or more hardware devices.

10. The apparatus of claim 9, wherein the sending code is further configured to cause the at least one processor to:
send the data file to a social application server, to generate a running state query message of the one or more hardware devices in the server of the one of the one or more hardware devices; and
acknowledge, from the social application server to the server of the one of the one or more hardware devices, an instruction execution message including the data file that is sent in response to an activated running state of the one or more hardware devices.

11. The apparatus of claim 8, wherein the sending code is further configured to cause the at least one processor to, based on the near field communications connection being established, send, to the one of the one or more hardware devices, device identifier information obtaining request, and the establishing code is further configured to cause the at least one processor to:
receive, from the one of the one or more hardware devices, device identifier information one of the one of the one or more hardware devices; and
establish an association relationship between the apparatus and the device identifier information.

12. The apparatus of claim 8, wherein the sending code is further configured to cause the at least one processor to, based on the user input for near field communications, send, to a social application server, the data file of the one of the one or more messages,
the apparatus further comprises receiving code configured to cause the at least one processor to receive, from the social application server, the data file that is security-processed, and
the sending code is further configured to cause the at least one processor to send, to the one of the one or more hardware devices, the data file that is security-processed, using the near field communications connection established with the one of the one or more hardware devices.

13. The apparatus of claim 8, the sending code is further configured to cause the at least one processor to:
obtain a link address of the data file of the one of the one or more message; and
send the link address to the one of the one or more hardware devices.

14. A non-transitory computer-readable storage medium storing instructions that cause at least one processor of a terminal to:
display one or more messages, each of the one or more messages comprising a data file;
based on a touch and hold input on one of the one or more messages, display an option for displaying one or more icons respectively indicating one or more hardware devices capable of executing the data file of the one of the one or more messages;
based on a touch input on the option, display the one or more icons respectively indicating the one or more hardware devices;
based on a touch input on one of the one or more icons indicating one of the one or more hardware devices, send, to the one of the one or more hardware devices, the data file of the one of the one or more messages;
establish a near field communications connection with the one of the one or more hardware devices, using a wireless network access plug-in; and
based on a user input for near field communications, send, to the one of the one or more hardware devices, the data file of the one of the one or more messages, using the near field communications connection established with the one of the one or more hardware devices.

15. The non-transitory computer-readable storage medium of claim 14, wherein the instructions further cause the at least one processor to, based on a user input for cloud communications, send the data file of the one of the one or more messages to the one of the one or more hardware devices through a server of the one of the one or more hardware devices.

16. The non-transitory computer-readable storage medium of claim 14, wherein the instructions further cause the at least one processor to:
based on the near field communications connection being established, send, to the one of the one or more hardware devices, device identifier information obtaining request;

receive, from the one of the one or more hardware devices, device identifier information one of the one of the one or more hardware devices; and establish an association relationship between the terminal and the device identifier information.

17. The non-transitory computer-readable storage medium of claim 14, wherein the instructions further cause the at least one processor to, based on the user input for near field communications:

send, to a social application server, the data file of the one of the one or more messages;

receive, from the social application server, the data file that is security-processed; and send, to the one of the one or more hardware devices, the data file that is security-processed, using the near field communications connection established with the one of the one or more hardware devices.

\* \* \* \* \*

UNITED STATES PATENT AND TRADEMARK OFFICE
CERTIFICATE OF CORRECTION

PATENT NO. : 10,547,999 B2  
APPLICATION NO. : 16/032685  
DATED : January 28, 2020  
INVENTOR(S) : Suipeng Qi et al.

Page 1 of 1

It is certified that error appears in the above-identified patent and that said Letters Patent is hereby corrected as shown below:

On the Title Page

Under Inventors, please correct the ninth inventor from "Feng LIU" to --Feng LU--

Signed and Sealed this
Second Day of March, 2021

Drew Hirshfeld
*Performing the Functions and Duties of the
Under Secretary of Commerce for Intellectual Property and
Director of the United States Patent and Trademark Office*